(12) United States Patent
Carlson et al.

(10) Patent No.: US 6,910,032 B2
(45) Date of Patent: Jun. 21, 2005

(54) PARALLEL DATABASE QUERY PROCESSING FOR NON-UNIFORM DATA SOURCES VIA BUFFERED ACCESS

(75) Inventors: David Glenn Carlson, Rochester, MN (US); Tariq Mahmood Choudhry, Rochester, MN (US); Kevin James Kathmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 10/165,235

(22) Filed: Jun. 7, 2002

(65) Prior Publication Data

US 2003/0229640 A1 Dec. 11, 2003

(51) Int. Cl.[7] .............................................. G06F 17/30
(52) U.S. Cl. ............................................. 707/3; 4/5
(58) Field of Search .............................. 707/1–5, 100, 707/102, 104.1

(56) References Cited

U.S. PATENT DOCUMENTS

| | | | |
|---|---|---|---|
| 5,412,804 A | 5/1995 | Krishna | |
| 6,064,816 A | 5/2000 | Parthasarathy et al. | |
| 6,263,328 B1 | 7/2001 | Coden et al. | |
| 6,289,334 B1 * | 9/2001 | Reiner et al. | 707/3 |
| 6,314,430 B1 | 11/2001 | Chang | |
| 2002/0035559 A1 | 3/2002 | Crowe et al. | |
| 2003/0187858 A1 | 10/2003 | Kirk et al. | |
| 2003/0208489 A1 * | 11/2003 | Todd | 707/8 |

OTHER PUBLICATIONS

G. Mitchell, "Extensible Query Processing in an Object–Oriented Database," May 1993, Thesis, Department of Computer Science, Brown University, pp. 1–166.

IBM Patent Application filed on even date herewith by Carlson et al., "Runtime Query Optimization for Dynamically Selecting from Multiple Plans in a Query Based Upon Runtime–Evaluated Performance Criterion" (ROC920010235US1).

IBM Patent Application filed on even date herewith by Carlson et al., "Method for Efficient Processing of Multi–State Attributes" (ROC920010305US1).

IBM Patent Application filed on even date herewith by Carlson et al., "Object–Oriented Query Execution Data Structure" (ROC920020104US1).

* cited by examiner

*Primary Examiner*—Alford W. Kindred
(74) *Attorney, Agent, or Firm*—Wood, Herron & Evans

(57) ABSTRACT

An apparatus, program product and method utilize a dynamically-populated query buffer to facilitate the handling of at least a portion of a database query in parallel. A query is implemented using at least first and second portions, where the second portion of the query is executed in parallel using a plurality of threads. The first portion of the query is executed to dynamically populate a query buffer with records from a data source, and the plurality of threads that execute the second portion of the query are specified to the query buffer so that the effective data source for the second portion of the query comprises the records that are dynamically populated into the query buffer.

26 Claims, 10 Drawing Sheets

```
                      INNER JOIN NODE
NODE DATA MEMBERS:
      XLEFTCHILD    //POINTER TO LEFT CHILD NODE
      XRIGHTCHILD   //POINTER TO RIGHT CHILD NODE
      XFETCHLEFT    //FLAG INITIALLY SET TO "TRUE"

NODE LOGIC:

FOR (;;) {
      IF (XFETCHLEFT) {
          STATUS=XLEFTCHILD.EXECUTE()
          IF(STATUS==TRUE) {
              XRIGHTCHILD.POSITIONBEFORESTART()  //RESET RIGHT CHILD
              STATUS=XRIGHTCHILD.EXECUTE()
              IF(STATUS==TRUE) {
                  XFETCHLEFT=FALSE
                  BREAK                          //RETURN TO CALLER, HIT ON RIGHT SUBTREE
              }
              ELSE
                  CONTINUE;                      //LOOP AGAIN
          }
          ELSE BREAK;
      }
      ELSE {
          STATUS=XRIGHTCHILD.EXECUTE()
          IF(STATUS==TRUE)
              BREAK;                             //RETURN TO CALLER, HIT ON RIGHT SUBTREE
          ELSE
              XFETCHLEFT=TRUE;                   //RIGHT SUBTREE EXHAUSTED, RETURN TO LEFT
      }
```

FIG. 5B

PARALLEL DATABASE QUERY PROCESSING FOR NON-UNIFORM DATA SOURCES VIA BUFFERED ACCESS

CROSS-REFERENCE TO RELATED APPLICATIONS

This application is related to U.S. Ser. No. 10/165,025, filed on even date herewith by David Glenn Carlson et al. and entitled "RUNTIME QUERY OPTIMIZATION FOR DYNAMICALLY SELECTING FROM MULTIPLE PLANS IN A QUERY BASED UPON RUNTIME-EVALUATED PERFORMANCE CRITERION" (hereinafter "Carlson I") (IBM ROC920010235US1), to U.S. Ser. No. 10/164,767, filed on even date herewith by David Glenn Carlson et al. and entitled "METHOD FOR EFFICIENT PROCESSING OF MULTI-STATE ATTRIBUTES" (hereinafter "Carlson II") (IBM ROC9200102305US1), and to U.S. Ser. No. 10/165,293, filed on even date herewith by David Glenn Carlson et al. and entitled "OBJECT-ORIENTED QUERY EXECUTION DATA STRUCTURE" (hereinafter "Carlson III") (IBM ROC920020104US1). The disclosures of each of these applications are incorporated by reference herein.

FIELD OF THE INVENTION

The invention relates to database management systems, and in particular, to the parallel processing of database queries.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. As the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query. In addition, a reduced reliance on runtime interpretation of queries in favor of increased usage of directly-executable program code has improved query engine performance.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

For example, one manner of improving database performance is through the use of parallelism, e.g., by utilizing multiple microprocessors and/or multiple computers to handle a database's management and query execution functionalities. In many instances, such parallelism is limited to parallel processing of multiple queries, i.e., so that multiple queries and concurrently executed by various processors and/or computers in a database management system. Particularly where a large number of users are attempting to access a database at the same time, the parallel processing of multiple queries often decreases wait times for individual users and improves overall database throughput.

However, in other instances, it may be desirable to execute individual queries using parallel processing, so that various sub-operations in the queries are concurrently executed. As a result of utilizing parallelism when executing individual queries, substantially faster execution of individual queries may be obtained.

Implementing parallelism within individual queries, however, is often more problematic than simply executing different queries in parallel, given that many operations within a query are interdependent, i.e., many later operations depend upon the results of earlier operations. Thus, parallelism has to date found only limited applicability in the execution of individual database queries.

One difficulty associated with implementing parallelism within queries, for example, is due to the difficulty associated with dividing ranges of records into discrete subranges in many circumstances. For example, an index probe of a table is not readily adaptable to being broken up into sub-operations because accessing a compacted, space-efficient index data structure is typically not well suited for linear decomposition.

This is in contrast to other types of operations, such as scan probes, which, due to their sequential nature, could be implemented in parallel with much less difficulty, typically just by breaking up the range of records in the search space for the probe into multiple, discrete subranges, and handling those subranges in different threads. Thus, given a scan probe that steps through a table of 100,000 records, separate execution threads could implement such a scan probe by operating upon discrete subranges such as records 1–9,999, 10,000–19,999, etc. Since the collections of records in each subrange would be unique, the uniqueness of the overall result set culled from the results of all of the threads would be ensured.

Therefore, a significant need exists in the art for a manner of implementing parallelism in the execution of individual database queries, and in particular, for a manner of implementing parallelism in individual database queries that incorporate operations that are not readily divisible into discrete subranges.

SUMMARY OF THE INVENTION

The invention addresses these and other problems associated with the prior art by providing an apparatus, program product and method in which a dynamically-populated query buffer is utilized to facilitate the handling of at least a portion of a database query in parallel. In particular, consistent with the invention a query is implemented using at least first and second portions, where the second portion of the query is executed in parallel using a plurality of threads. The first portion of the query is executed to dynamically populate a query buffer with records from a data source. In addition, the plurality of threads that execute the second portion of the query are specified to the query buffer so that the effective data source for the second portion of the query comprises the records that are dynamically populated into the query buffer.

Typically, dynamic population of the query buffer occurs serially to ensure the integrity of the execution of the first portion of the query on the original data source, in particular to ensure that records will not be duplicated within the query buffer. However, population may be performed by various program entities in various embodiments consistent with the invention, including one of the threads that execute the second portion of the query, or another thread altogether. Furthermore, multiple threads may be capable of populating the query buffer at different times, so long as serialization of the population process is maintained.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIGS. 5A–5D illustrate an exemplary implementation of a query in an exemplary database in the computer system of FIG. 1.

DETAILED DESCRIPTION

The embodiments discussed hereinafter utilize a dynamically-populated query buffer to facilitate parallel database query processing in a database management system. However, prior to a discussion of a specific implementation of such parallel database query processing functionality, a brief discussion will be provided regarding an exemplary hardware and software environment, and an exemplary object-oriented query model, within which parallel database query processing can be implemented. As will become more apparent below, however, it will be appreciated that the herein-described functionality may be utilized in environments other than that described below. Therefore, the invention is not limited to the particular environments described herein.

Hardware/Software Environment

Figure 1:
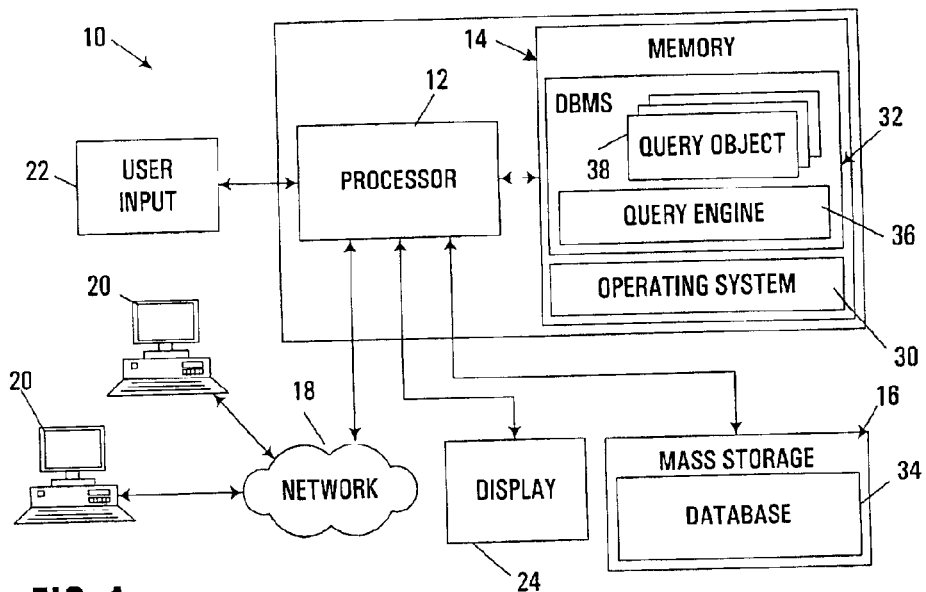
FIG. 1 is a block diagram of a computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system incorporating parallel database query processing consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Object-Oriented Query Model

As discussed above, various embodiments of the invention may be implemented within a database management system (DBMS) incorporating an object-oriented query model. As shown in FIG. 1, for example, a database management system 32 may be used to access a database 34, representing a data space, with database management system 32 including a query engine 36 configured to execute database queries that are implemented using one or more query objects 38.

Figure 2:
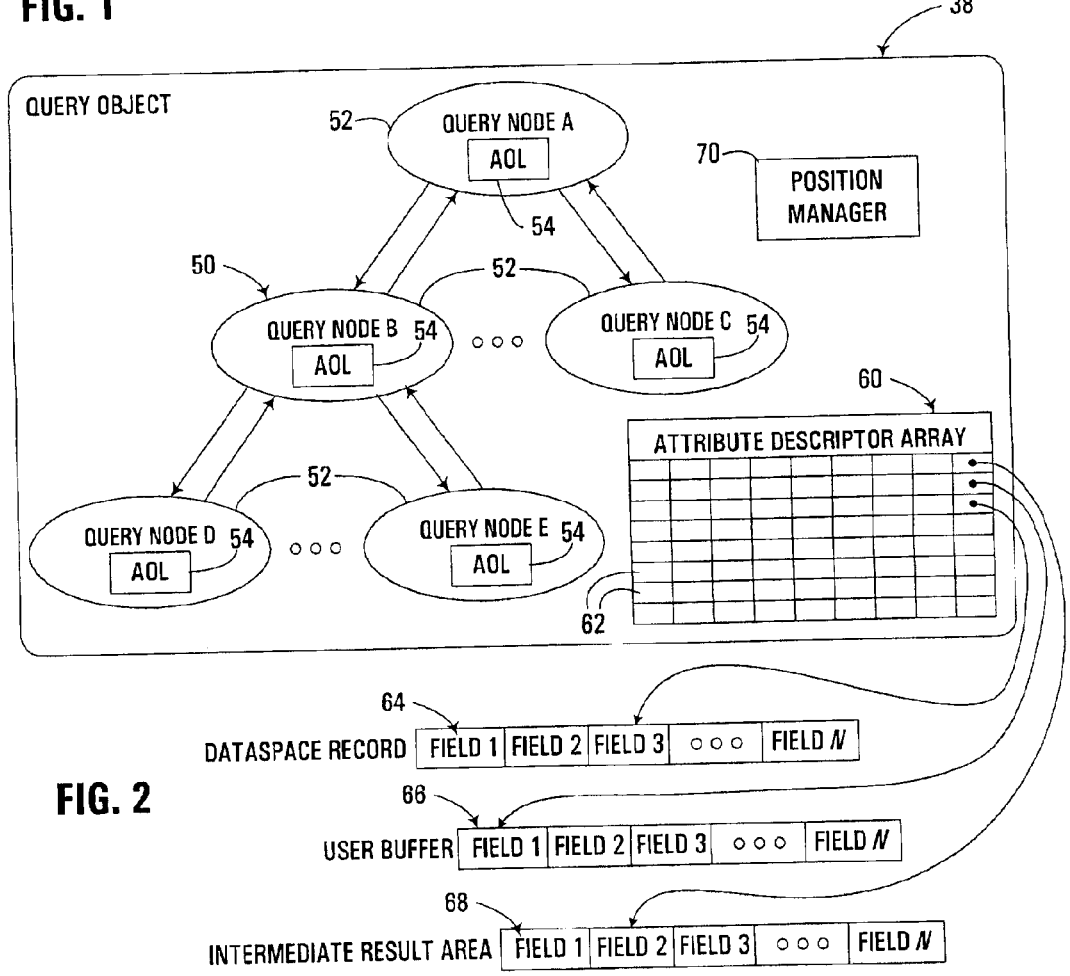
FIG. 2 is a block diagram illustrating the principal architecture of an exemplary query object from the computer system of FIG. 1.

FIG. 2 illustrates an exemplary implementation of a query object 38, capable of being executed by query engine 36 of FIG. 1. A query object generally includes a query execution tree 50 packaged with an attribute descriptor array 60. Moreover, the query object typically includes a number of methods capable of performing specific operations relevant to management of the query object and the execution of a query represented by such an object, as will be described further hereinafter.

In addition, a query object 38 may also include a position manager 70 that incorporates locking information for ensuring data integrity and preventing race conditions, which is particularly useful in connection with parallel execution of queries. Position manager 70 also performs various additional functions such as transaction processing and commitment control. Alternate functionality may be implemented with a query object consistent with the invention.

Query execution tree 50 supports the definition of an entire query in a tree structure, where a plurality of query nodes 52 are organized such that operations are performed in a generally bottom-up manner, whereby each parent node operates on the result data returned from its respective child node(s). In addition, sibling nodes that share a common parent will typically be executed in a nested manner from left to right, so that execution of one node that is to the right of another node is nested within the execution of the other node. In other environments, however, other orders of execution of the various nodes in a tree may be used.

Each query node 52 typically incorporates the logic (algorithms) required to perform specific tasks in connection with a query. To define these tasks, each query node typically includes one or more attribute operation lists (AOL's) 54, that define certain operations to be performed by that node. However, in some embodiments, attribute operation lists may not be disposed within each query node, particularly where a particular node operates in a predefined manner on the result data returned by its child nodes, and without regard for the specific results returned by those nodes. In such instances, the operations of such nodes may be hard-coded for greater performance and efficiency.

Attribute descriptor array 60 defines the fields that are operated upon by a query. The array defines a vector of attribute descriptors 62 that describe a particular field utilized in a query. Each attribute descriptor 62 also contains a reference to the actual field.

As will become more apparent below, each attribute descriptor can reference practically any data accessible to a database engine. For example, an attribute descriptor can reference a field 64 in a data space record, i.e., a table entry in the database. In the alternative, an attribute descriptor can reference a field 66 in a user buffer, i.e., the result buffer into which results are ultimately deposited. Moreover, an attribute descriptor may reference a field 68 in an intermediate result area, which functions as a working space or temporary storage utilized during execution of a query, and which may be used to store support information such as constants and temporary variables.

Figure 3:
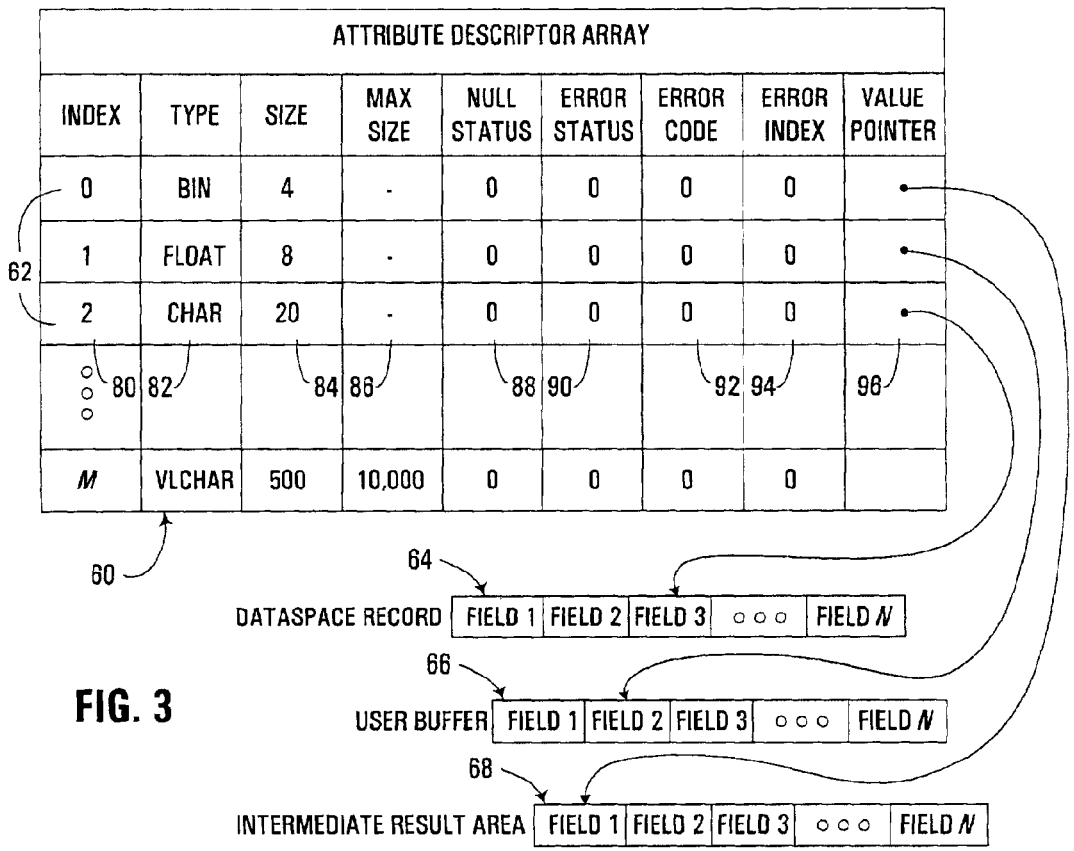
FIG. 3 is a block diagram of an exemplary attribute descriptor array from the query object of FIG. 2.

FIG. 3, for example, illustrates an exemplary attribute descriptor array 60 including a plurality of entries 62 defining attribute descriptors for various types of attributes. Each entry 62 includes a plurality of fields 80–96, which describe a particular type of attribute. Field 80 stores an index into the attribute descriptor array, and is used to locate a particular attribute in the array. Field 82 stores a data type, representing the type of data contained by the field. Fields 84 and 86 respectively store the size and maximum size (if appropriate) of a particular field. Fields 88, 90, 92 and 94 respectively store a null status flag, an error status flag, an error code and an error index that points to the source of an error.

Field 96 stores a reference to a particular field in the data space, user buffer or intermediate result area to be operated upon during execution of the query. As will become more apparent below, the reference stored in field 96 for a particular described attribute may be updated during execution of the query to point to appropriate fields in records being operated upon by the query. As a result, during the execution of a query, the references associated with each attribute descriptor are typically updated continuously as new records are processed by the query.

It should be appreciated that different status and attribute description information may be stored in each entry 62 or array 60. Moreover, other data structures may be used to represent the attributes to be acted upon by a query. Therefore, the invention is not limited to the particular collection of descriptor information illustrated in FIG. 3.

Figure 4:
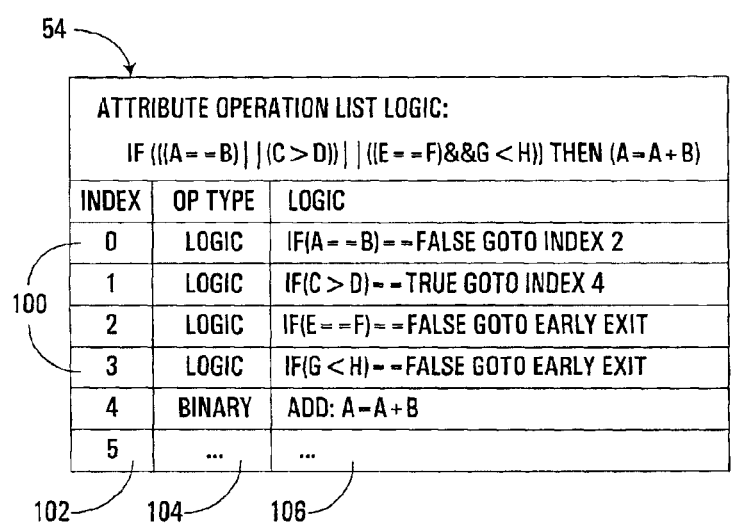
FIG. 4 is a block diagram of an exemplary attribute operation list from the query object of FIG. 2.

FIG. 4 illustrates an exemplary attribute operation list 54. An attribute operation list defines one or more attribute operations that manipulate and/or compare attribute descriptors in an attribute descriptor array. An attribute operation list typically contains all of the data manipulation and comparison logic required to do one iteration of work. Typically, such attribute operation lists are interatively executed to process a set of records in the context of executing a query.

Typically, an attribute operation list, when executed, is passed a parameter that identifies the current database record upon which to perform the predetermined operation. Functionality defined within methods capable of being called in the attribute operation list is used to update the attribute descriptor array entries to point to the appropriate fields in the current database record, the intermediate result area and/or the user buffer, such that the references in the attribute descriptor array can be utilized in executing the attribute operation list.

As shown in FIG. 4, an attribute operation list 54 therefore includes a plurality of attribute operation entries 100, each including a field 102 storing an index or pointer to that operation, a field 104 storing the type of operation, and a field 106 storing the precise logic to execute for that operation. While in the discussion herein, the attribute operation data structure is described as a list or array, it should be appreciated that such a data structure may be implemented in a number of alternate manners, e.g., via a tree or graph of linked attribute operation objects, as described in the aforementioned Carlson II application.

The operation type field 104 may store various types of operation categories, including, for example, logic types, binary types, set attribute descriptor types, ternary types, etc. In addition, an innumerable number of logic operations may be defined in each field 106. Moreover, this logic may be represented in any number of manners, including script, executable code, interpreted code, etc.

In the exemplary attribute operation list illustrated in FIG. 4, for example, the operation used to implement the logic "IF (((A=B) OR (C>D)) OR ((E=F) AND (G<H)) THEN A=A+B)" is illustrated in the entries 100 having indices of 0–4. In this example, the parameters A, B, C, D, E, F, G and H each represent pointers to attribute descriptor entries in the attribute descriptor array, with these attribute descriptors initially set to point to appropriate fields in the data space, user buffer and/or intermediate result area to perform the given attribute operation logic upon a number of fields.

Given the wide variety of tasks that may be performed in the operation of a query, it will be appreciated that an innumerable number of statement types, commands, program flow commands, etc., may be stored within an attribute operation list consistent with the invention. Moreover, various manners of implementing the logic in an attribute operation list may be used. For example, in the illustrated implementation, live execution of virtual objects may be used. Further detail on one desirable implementation of attribute operation lists is provided, for example, in the aforementioned Carlson II application.

In other embodiments, the attribute operation list logic may be implemented in other manners, e.g., via interpretive code. Given the innumerable number of manners that attribute operation list logic could be implemented, the invention is not limited to the particular implementations discussed herein.

Figure 5A:
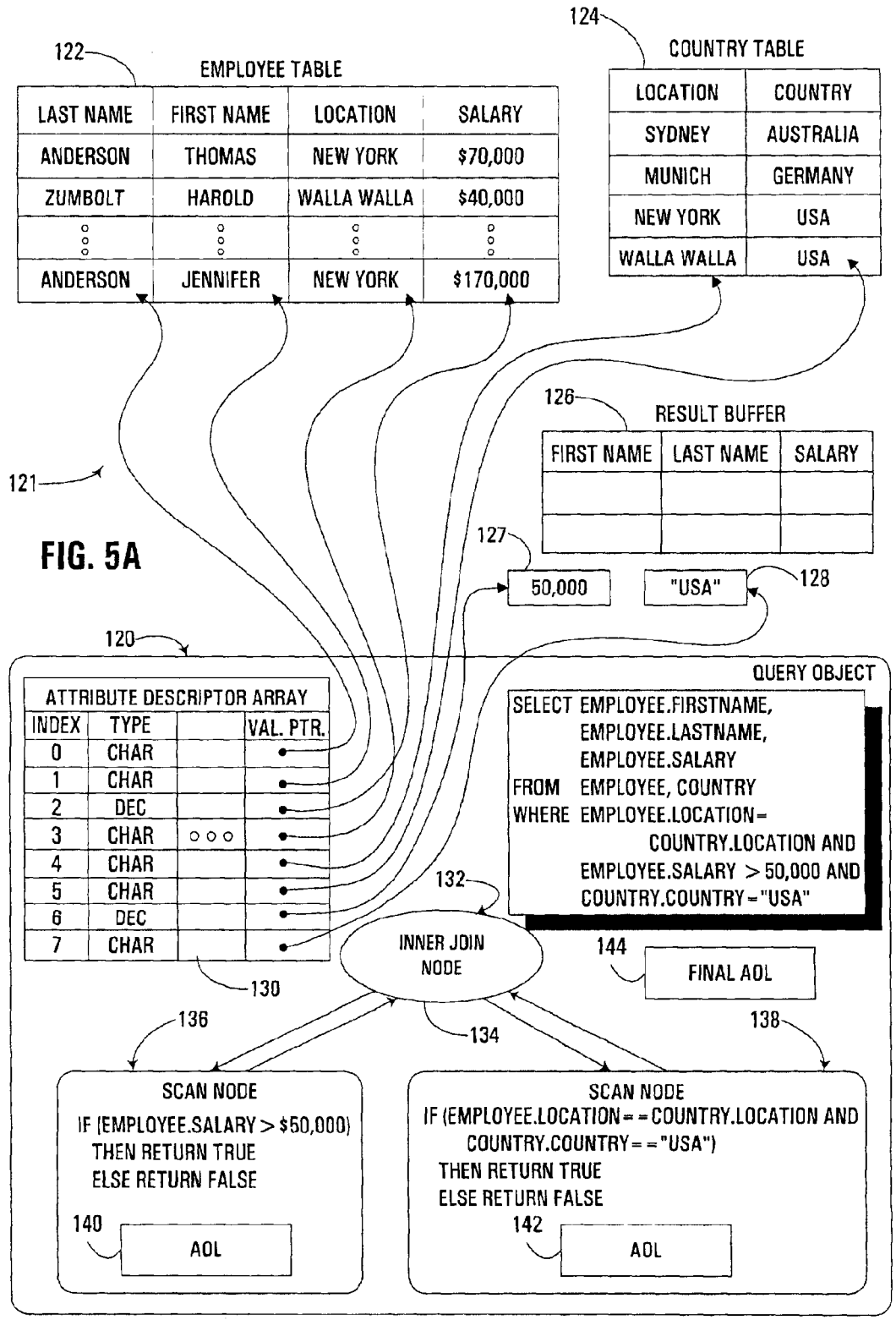

Turning next to FIGS. 5A–5D, an exemplary implementation of a query using the herein-described database management system is shown. In particular, FIG. 5A, illustrates an exemplary query object 120 suitable for performing a query on an exemplary database 121.

Assume, for the purposes of this example, that database 121 includes, in part, an Employee table 122 and a Country table 124. The Employee table 122 includes fields for Last Name, First Name, Location, and Salary for each employee, while the Country table 124 includes fields for Location and Country.

Assume also that a user wishes to find all employees who make over $50,000 per year, and who live in the United States, and to display the first and last names and salaries of those matching employees.

Query object 120 as illustrated may be used to perform the user's desired query, and return the results in a result buffer 126. To this extent, query object 120 includes an attribute descriptor array 130 and a query execution tree 132. It should be noted that the attribute descriptor array is global with respect to the nodes within tree 132, and thus is capable of being used for communication between the various nodes in the tree.

Array 130 includes attribute descriptor entries at indices 0, 1, 2 and 3 that respectively point to the Last Name, First Name, Salary and Location fields in a current row in table 122, and attribute descriptor entries at indices 4 and 5 that respectively point to the Location and Country fields in a current row in Country table 124. The attribute descriptor entries at indices 6 and 7 point to a pair of constants 127 and 128 (e.g., stored in an intermediate result buffer) required to implement the query.

Tree 132 includes three nodes, an inner join node 134 and a pair of scan nodes 136, 138, each including a corresponding attribute operation list 140, 142. Together, these nodes implement the SQL statement:

```
SELECT Employee.FirstName, Employee.LastName, Employee.Salary
    FROM Employee, Country
        WHERE Employee.Location=Country.Location AND
            Employee.Salary>50,000 AND
            Country.Country="USA"
```

Scan nodes 136 and 138 respectively implement scans of the Employee and Country tables 122 and 124. Scan node 136 attempts to locate a next record in Employee table 122 where the Salary field is greater than $50,000, while scan node 138 attempts to determine whether the Location field of a matching record returned by scan node 136 has a corresponding record in the Country table with a Country field matching "USA".

FIG. 5B illustrates in greater detail the basic logic implemented in inner join node 134. The logic in node 134 (which is illustrated in the figure in pseudocode form) may be hard coded, or in the alternative, may incorporate an attribute operation list if desired.

As shown in FIG. 5B, the inner join node has data members including pointers to the left and right child nodes (here scan nodes 136 and 138), as well as an additional flag used by the node logic represented thereafter in the figure. The logic principally operates by calling PositionNext( ) and Execute( ) methods on the left and right child nodes in a nested manner, and using a PositionBeforeStart( ) method on scan node 138 to reset a record pointer to the Country table 124 upon each successful location of a record matching the criterion for Employee table 122 upon execution of scan node 136.

Returning briefly to FIG. 5A, to populate a result buffer using the records selected by query execution tree 132, query object 120 may incorporate program code, e.g., in the form of a "final" attribute operation list 144, which typically may be executed for each record selected by query execution tree 132 to populate the result buffer with the desired fields for the selected record (e.g., for the example query above, the FirstName, LastName and Salary fields). An AOL 144 may incorporate, for example, a sequence of mapping operations to map fields from a selected record to appropriate locations in the result buffer.

Figure 5C:
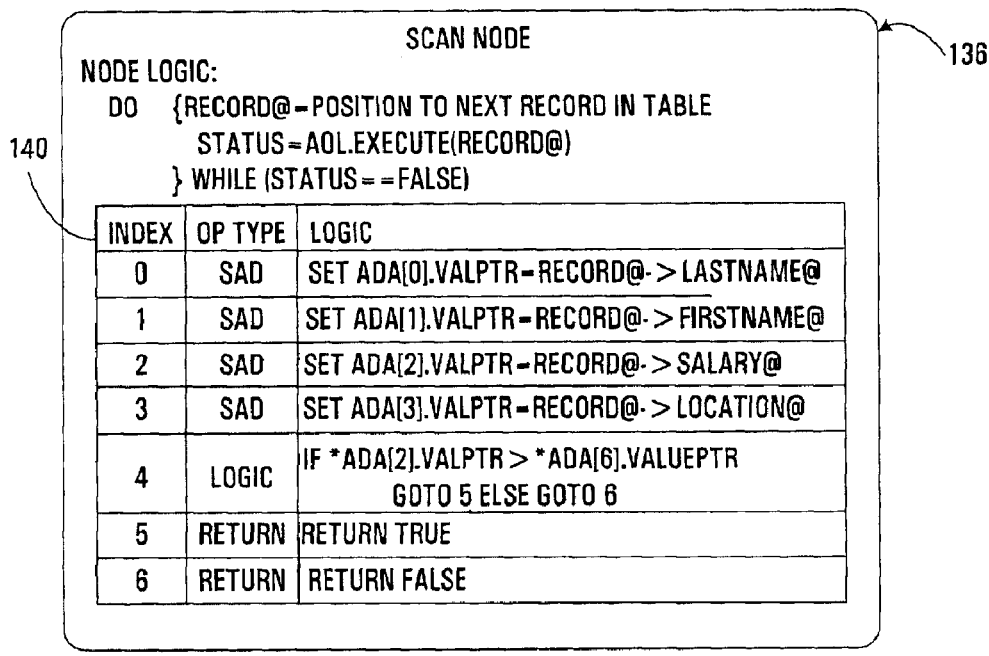
Figure 5D:
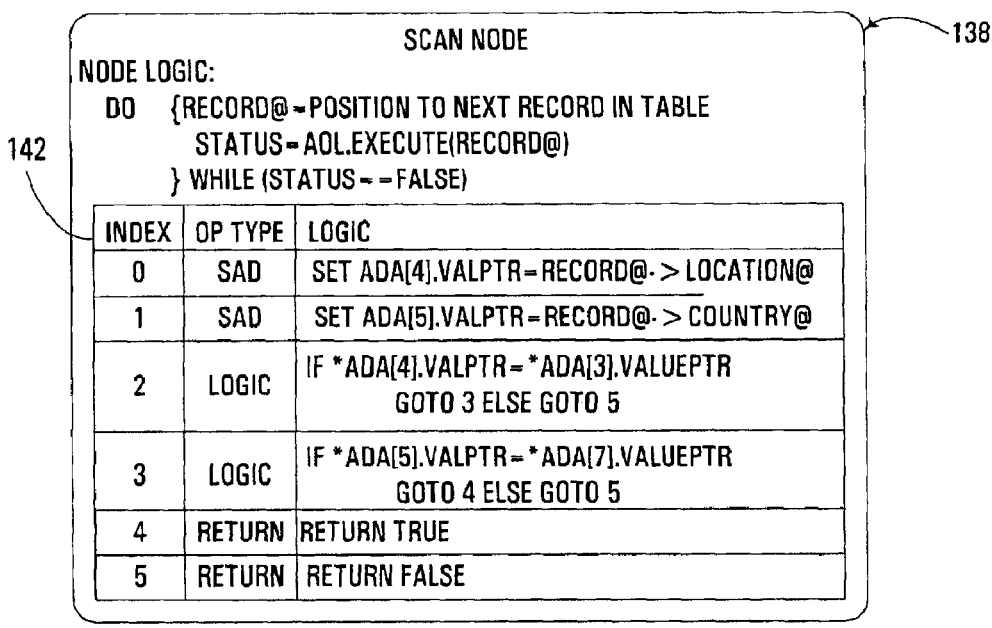

As shown in FIGS. 5C and 5D, scan nodes 136 and 138 incorporate essentially the same hard coded logic to repeatedly invoke an Execute( ) method on the respective attribute operation list 140, 142 to locate a next record matching the defined criterion. Thus, the functionality of these nodes is distinguished principally by the configuration of the respective attribute operation lists 140, 142. As a consequence, it may be appreciated that a generic dataspace scan node object may be adapted to implement a particular dataspace scan operation on a table with relatively little effort, simply through the construction of an attribute operation list performing the appropriate actions for the dataspace scan operation. Doing so allows for a reasonable set of total nodes to be defined and supported by a query engine, but still allows for very tailored and efficient nodes performing very specific tasks.

As shown in FIG. 5C, attribute operation list 140, at indices 0–3, performs Set Attribute Descriptor (SAD) operations to set the value pointer (VALPTR) fields of the attribute descriptors at indices 0–3 of array 120 (ADA[0]–ADA[3]) to point to the Last Name, First Name, Salary and Location fields of a current row or record in Employee table 122. Index 4 of list 140 is a Logic statement that tests whether the Salary field of the current record (now pointed to by ADA[2]) is greater than the constant stored in ADA[6] (here, constant 127), and that passes control to the statements at either of indices 5 and 6 based upon the result. Indices 5 and 6 are Return statements that return either a "true" or "false" status to the node logic.

As shown in FIG. 5D, attribute operation list 142, at indices 0–1, performs Set Attribute Descriptor (SAD) operations to set the value pointer (VALPTR) fields of the attribute descriptors at indices 4–5 of array 120 (ADA[4]–ADA[5]) to point to the Location and Country fields of a current row or record in Country table 124. Index 2 of list 142 is a Logic statement that tests whether the Location field of the current record in the Country table (now pointed to by ADA[4]) matches the Location field of the current record in the Employee table (now pointed to by ADA[3]). Index 3 of list 142 is a Logic statement that tests whether the Country field of the current record in the Country table (now pointed to by ADA[5]) matches the constant stored in ADA[7] (here, constant 128). If both conditions are met, control will pass to index 4 to return a "true" result, otherwise, a "false" result will be returned as a result of control passing the index 5.

It will be appreciated that FIGS. 5A–5D illustrate a relatively simple example of a query implementation using the aforementioned query object model. However, it will equally be appreciated that implementation of more complex queries occurs in much the same manner as described in connection with the aforementioned figures.

It will be appreciated by one of ordinary skill in the art having the benefit of the instant disclosure that the aforementioned query object model provides a highly extensible, flexible and powerful model for creating database queries, and having many of the benefits afforded by object-oriented concepts. Through the provision of appropriate libraries of attribute descriptor arrays, attribute operation lists, query nodes, query execution trees and/or query objects, new database queries can be rapidly assembled from pre-existing structures, and pre-existing structures can be modified or extended as necessary to support new functionality and data structures, without affecting the functionality of other structures.

In the illustrated embodiment, it may be desirable to incorporate a number of different types of query nodes into a library for use in constructing query objects. The various types of nodes may include, for example, unary nodes (nodes that have single child nodes, and that control the flow of execution to those child nodes), binary nodes (nodes that have two child nodes, and that control the flow of execution to those child nodes), leaf nodes (nodes without any children nodes, and typically constructed to access a given native or query data source), and join-type nodes (binary nodes that perform join operations using the results of two child nodes). It should also be appreciated that, in many instances, the children of a particular node may themselves incorporate one or more children, such that, for example, a unary node may have a single child node that is, itself, the root of a subtree comprising multiple nodes.

In addition, typically only leaf nodes need be bound to a given data source at construct time. Other node types may be configured to access data items from data sources by referencing appropriate attribute descriptors in an attribute descriptor array, and using attribute operations as defined in a node's attribute operation list(s).

In the illustrated embodiment, nodes of all such types may be based upon a base node class that define's a standard set of return statuses (e.g., False, Error, Null, True, Interrupt Pending, Exceptions, Lock Failure, etc.), a set of statistical outputs (e.g., cycle counts, instruction counts), a node number or identifier that uniquely identifies each node within a tree of nodes, as well as various virtual methods that may be accessed by other nodes (e.g., to provide functions such as position before start, position after end, validate, refresh, position before, position after, position next and execute, position previous and execute, resume, cleanup, etc.

As an example of the various types of unary nodes that may be desirable to incorporate into a library, collections of any or all of the following nodes may be supported in the illustrated embodiment:

Aggregate Node—Used to perform an aggregation of data provided from a child node or subtree. Assumes a child node provides the data in a group-by order. An aggregate node may have three different attribute operation lists (AOL's), one to initialize the current group, one to perform per group entry processing, and a final one to perform end of group processing.

Logic Node—Incorporates an attribute operation list that is run when its child node returns true.

Dsp Probe Node—Used to randomly access a table. May contain a reference to a Relative Record Number (RRN). Typically would have an index access node as its child node that sets the RRN. A Dsp Probe Node may call its child node first and then execute its own AOL.

Sort Node—Used to sort data provided by its child node.

IO Node—Used to perform I/O operations against a data source. Typically would have the data source as its child node. May have derived classes to be used in conjunction with specific data sources (i.e., dataspace, hash tables, bitmaps, etc.), and/or how those datasources will be accessed. Subtypes may include a Dsp IO Sequential node that can be used in conjunction with a Dsp Scan Node, a Dsp IO Random node that can be used with a Dsp Probe Node, and a Din Random IO Node that buffers dataspace key values and rows. Providing I/O in separate nodes may provide greater flexibility to perform I/O, although in other embodiments, I/O operations may be incorporated into the same nodes.

Cache Node—Used to keep a cache of values around for reuse to avoid rerunning a child node and its underlying nodes. Each entry may have a key and the data for all attributes normally contributed by the underlying nodes. It may be desirable to include multiple types of cache nodes, e.g., one that eliminates duplicate values, another that contains all occurrences of a matching key.

As an example of the various types of binary nodes that may be desirable to incorporate into a library, collections of any or all of the following nodes may be supported in the illustrated embodiment:

And Node—Only returns TRUE if both child nodes return TRUE.

Or Node—Returns TRUE if either of its child nodes delivers TRUE.

UnionAll Node—Appends complete answer sets from child nodes. Typically keeps calling left child node until end of file and then calls right child node until it gives end of file. The result set contains all tuples from both subtrees.

Union Node—Combines two sorted result sets (subtrees) A and B. The result set contains all tuples from A and B, with duplicate tuples removed.

IntersectAll Node—Combines two sorted result sets (subtrees) A and B. The result set contains all tuples that are in both A and B.

Intersect Node—Combines two sorted result sets (subtrees) A and B. The result set contains all tuples that are in both A and B, with duplicate tuples removed.

Except Node—Combines two sorted result sets (subtrees) A and B. The result set contains all distinct tuples in A that are not in B.

As an example of the various types of leaf nodes that may be desirable to incorporate into a library, collections of any or all of the following nodes may be supported in the illustrated embodiment:

Dsp Scan Node—Used to implement a table scan.

Ptb Scan Node—Used to sequentially scan data from a Packed Tuple Buffer (PTB), i.e., a buffer of data.

Din Scan Node—Used to sequentially scan a dataspace index.

Pth Scan Node—Used to sequentially scan a Packed tuple hash (PTH) object (a hash table).

Pth Probe Node—Used to randomly access a packed tuple Hash object using a set of attributes as a key.

Rrn Bitmap Qds Scan Node—Used to scan an RRN bitmap and return valid RRN's allowing a parent node to access a table row.

Din List Probe Node—Used to access a dataspace index using a list of key ranges.

Din Probe Node—Used to search for a particular key value. These objects may have an Initial AOL that builds the search key value, along with an AOL that unbuilds the result key and does key selection.

Logic Leaf Node—Used to house an AOL, e.g., for an SQL statement that does not access any table.

Rrn List Qds Scan Node—Used to scan through an RRN list and return valid RRN's allowing a parent node to access a table row.

As an example of the various types of join-type nodes that may be desirable to incorporate into a library, collections of any or all of the following nodes may be supported in the illustrated embodiment:

Subquery Node—Used for a subquery case where the node returns a TRUE result if there is one hit from the right hand child node. On subsequent calls to the node, it will always go to the left hand child. Functions like a Distinct Inner Join.

Exception Join Node—Calls left child and if that returns TRUE, it calls right child. If right child returns TRUE, the left child is called again. If the right child returned FALSE, an AOL is called that will line up on the default record.

Inner Join Node—Calls left child, and if TRUE, calls right child. FALSE from left child causes this node to return FALSE. A FALSE from right child causes this node to recall its left child.

Left Outer Join Node—Calls right child after TRUE from left child and runs an AOL to position to the default row if the right child returns FALSE. If the right child returns TRUE, no AOL is run, and this node returns TRUE.

In addition, it may also be desirable to incorporate additional functionality, e.g., to support parallelism during query execution through the use of query buffers, as described hereinafter, or to support runtime query optimization, as described in the aforementioned Carlson I application.

As an example of the extensibility of the herein-described query model, consider the aforementioned exemplary query object illustrated in FIGS. 5A–5D. As discussed above, the query object implements a database query that returns the first and last names and salaries of all employees in a database who make over $50,000 per year, and who live in the United States. In doing so, the exemplary query object utilizes scan nodes to query employee and country tables in the database.

Suppose for the purposes of the example that a query optimizer determines through cost analysis that the most efficient way to implement the query would be to perform an index probe of the country table in lieu of scanning the table as is performed by the query object of FIGS. 5A–5D. To do so, an alternate query object may be constructed using many of the same components as are illustrated in FIGS. 5A–5D, but with an "index probe node" used in place of scan probe 138.

Figures 6A, 6B, 6C:
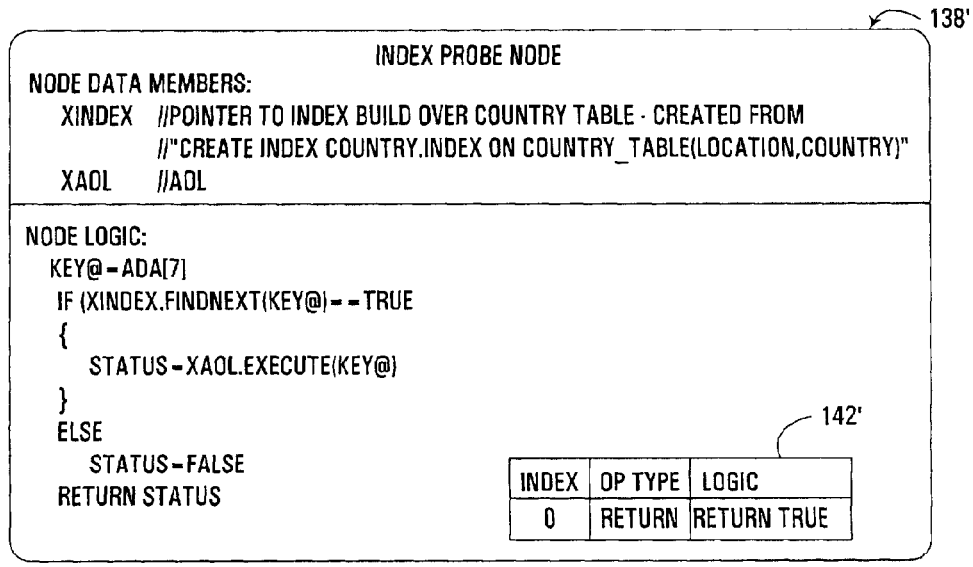
FIGS. 6A–6C illustrate an alternate index probe implementation to that of FIGS. 5A–5D.

FIG. 6A, for example, illustrates an exemplary index probe node 138' that may be used in an alternate query object to that of FIGS. 5A–5D, to implement essentially the same database query. In this alternate node 138', an essentially empty AOL 142' is used, with the selection functionality implemented within the index probe node itself. In other embodiments, an AOL may be used to implement the desired functionality, e.g., when selection is needed on non-leading key fields.

To implement an index probe, node 138' includes an xIndex pointer to an index that has been built over the country table, created via an SQL statement such as "CREATE INDEX Country_Index ON Country_Table (Location, Country)", and having a key format of (Location, Country). Node 138' also includes an xAOL pointer to the empty AOL 142' in the node.

The node logic for node 138' simply executes a "find next" method on the index, which returns a TRUE result upon locating another matching key in the Country table, or FALSE once no more matching keys are located.

To support the inclusion of node 138' in a query object, it may be necessary to modify other components in the object. For example, FIG. 6B illustrates an alternate attribute descriptor array 130' to that of FIG. 5A, which differs to the extent that no entry for Country. Location is required in array 130', and that an additional entry referencing a key build buffer is used (ADA[7]). In addition, as shown in FIG. 6C, an AOL 140' may be incorporated into scan node 136 of FIG. 5C, as an alternative to AOL 140. AOL 140' differs to the extent that, upon finding a matching record in the Employee table, a key build of the Location and Country fields of the Country table is performed at indices 5 and 6 of AOL 140'.

It will be appreciated that the creation of the aforementioned structures and their incorporation into a database management system, as well as the creation of a database engine and development environment suitable for both executing queries and developing new queries, would be well within the capabilities of one of ordinary skill in the art having the benefit of the instant disclosure. Moreover, it will be appreciated that any of the modifications and variations discussed in the aforementioned Carlson I, II, and III applications may also be incorporated into the various embodiments discussed herein.

It will further be appreciated that the herein-described object-oriented query model is merely exemplary in nature, and that the invention may be implemented in database management system using other object-oriented query models, as well as in other, non-object-oriented database management systems. Therefore, the invention is not limited to use solely in the particular database management system architecture described herein.

Parallel Database Query Processing with Dynamically-populated Query Buffer

To implement parallel database query processing consistent with the invention, a dynamically-populated buffer is utilized to supply a plurality of query threads with records from a data source upon which to perform a portion of a database query. Another portion of the query is executed to populate the buffer from a data source, and typically serialization is relied upon to ensure the integrity of the interim result set of records populated into the query buffer. The query threads that access the query buffer to perform their respective portion of the query are "specified" to the query buffer, such that the effective data source for that portion of the query is the result set of records generated as a result of dynamically populating the query buffer.

It will be appreciated that a query that utilizes the aforementioned query buffer includes at least two portions, including a first portion that populates the query buffer with records from a data source that match a first query criterion for the first portion, and a second portion that is executed in parallel by multiple threads, specified to the query buffer, and used to select records from the query buffer that match a second query criterion. It should be appreciated, however, that a query consistent with the invention may include additional portions that precede and/or succeed the first and second portions described above, as well as that are independent of such portions. As such, further query processing may be performed on the results of the second portion of the query. Moreover, the data source acted upon by the first portion of the query to dynamically populate the query buffer may be based upon the results of previous query operations.

As will become more apparent below, population of the query buffer may be performed by a thread separate from those that "consume" the query buffer when executing the second portion of the query, or one of the aforementioned threads may act both as a "producer" and a "consumer" for the query buffer. Moreover, as will become apparent from the illustrated implementation described below, multiple threads may cooperatively share in the producer overhead for the query buffer at different times, utilizing some form of serialization to ensure that only one thread is populating the query buffer at any given time.

It will be appreciated that the multiple "threads" that execute a query may reside on various computers and processors in such computers. For example, in a single processor, single computer database management system, multitasking at the operating system level may be relied upon to allocate execution resources to the multiple threads. More typically, however, multiple processors and/or the use of multithreaded processors are relied upon to host the multiple threads utilized herein. Moreover, in some embodiments multiple computers may be utilized to host the various threads that execute a query, whereby a query would be distributed across multiple computers. It will also be appreciated that in some multi-computer environments, certain computers may not support multi-tasking, and thus may inherently execute a single "thread", even though the term "thread" is not ordinarily used to describe such execution. Nonetheless, where multiple such computers are utilized to collectively process a query in parallel, the individual execution paths utilized by such computers may be considered to be "threads" within the context of the invention. As such, it will be appreciated that practically any computer environment capable of supporting multiple, concurrent execution paths may be utilized to implement the herein-described parallel query processing functionality.

Figure 7:
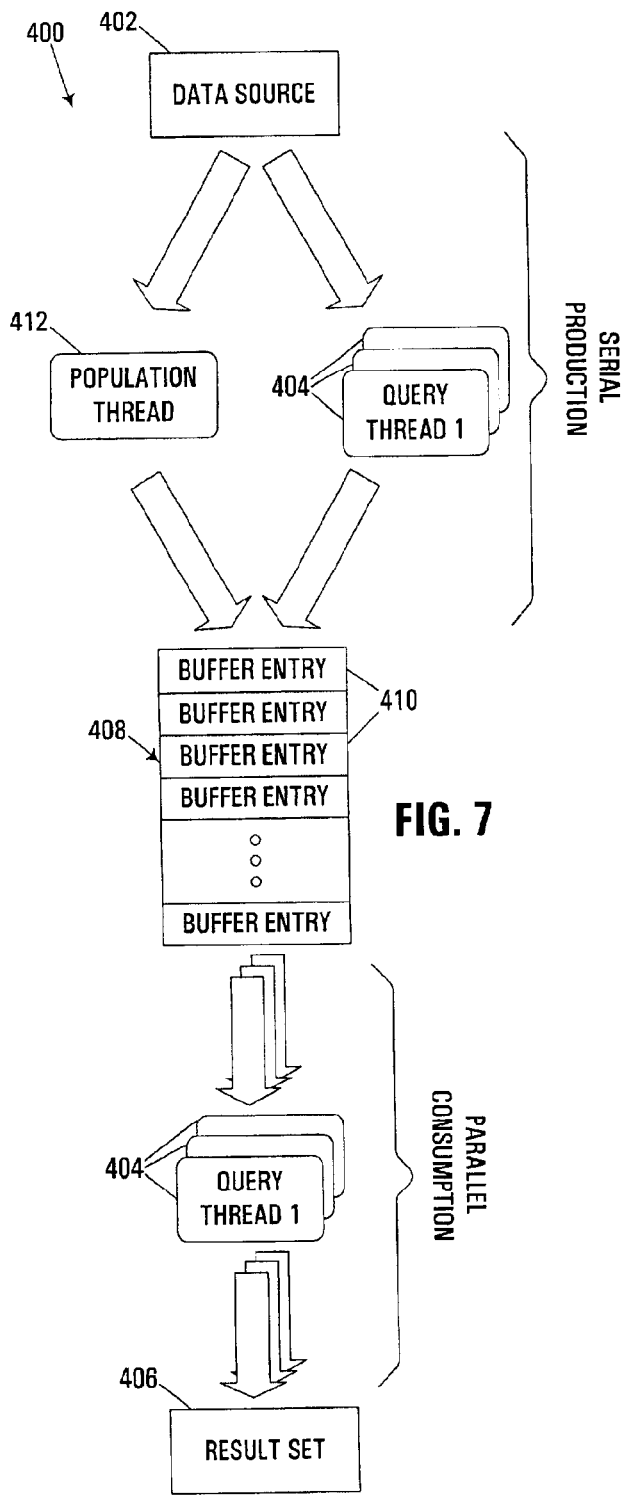
FIG. 7 is a block diagram illustrating the principal software components utilized in implementing a parallel query in a manner consistent with the invention.

To further illustrate the herein-described parallel query processing functionality, FIG. 7 illustrates an exemplary database management system 400 suitable for implementing parallel query execution in a manner consistent with the invention. System 400 includes a data source 402 that is acted upon by a set of query threads 404 to generate a result set 406. Query threads 404 are configured to collectively execute at least a portion of a query in parallel generally by processing data records from data source 402 and populating result set 406 with records that match the portion of the query implemented by the query threads.

To assist in this endeavor, a query buffer 408 including a plurality of buffer entries 410 is utilized by the plurality of threads 404. In this regard, query buffer 408 is utilized in a producer-consumer configuration, whereby records from data source 402 are populated in various entries 410 in query buffer 408, with the buffer entries consumed by query threads 404 when generating result set 406.

As will be discussed in greater detail below, in addition to serving as consumers, each query thread 404 may also serve as a producer for query buffer 408, and as such, the illustration of query threads 404 both above and below query buffer 408 in FIG. 7 represent such dual producer-consumer nature of the query threads.

In the alternative, as illustrated by population thread 412, a separate thread may be utilized to populate query buffer 408. In such alternate configuration, each query thread 404 may operate solely as consumer of buffer entries. In still another alternative embodiment, a population thread may be used in connection with one or more additional query threads to populate the buffer as desired.

Any number of data structures may be utilized to implement a query buffer 408 consistent with the invention. For example, as will be described in greater detail below, a query buffer may be represented using one or more queues. Moreover, a buffer entry consistent with the invention may store or identify any number of records from data source 402, although in the illustrated embodiment, each entry is configured to store or identify one record.

It will also be appreciated that, where an entry stores or identifies a plurality of records, the flexibility afforded by the usage of a dynamically-populated buffer permits the records within each buffer entry to be contiguous or non-contiguous in nature, and represent uniform or non-uniform interim result sets of records in the data source.

Figure 8:
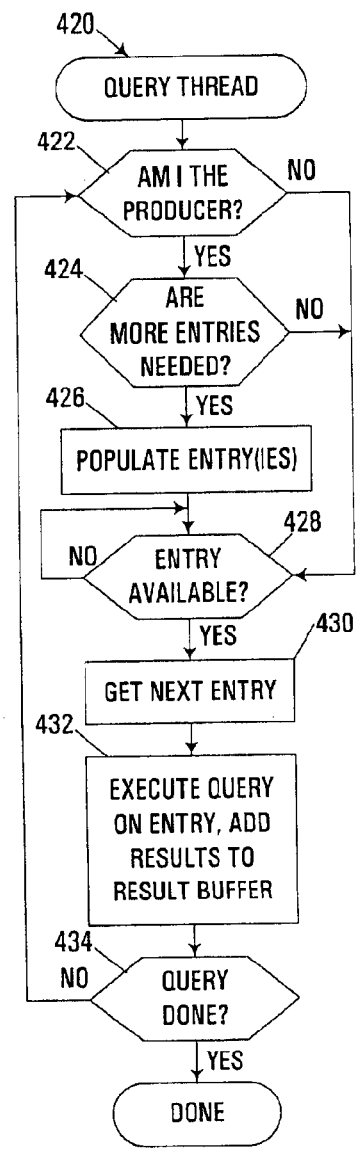
FIG. 8 is a flowchart illustrating the program flow of one of the query threads referenced in FIG. 7.

FIG. 8 illustrates, for example, one suitable routine 420 capable of being executed by a query thread from a database management system 400 of FIG. 7 that is configured to act as both a producer and consumer of the query buffer. In this exemplary routine, it is presumed that each query thread is utilized to execute a using a first portion of a query to dynamically populate the buffer, and to execute a second portion of the query to consume entries from the buffer. As discussed above, a separate population thread may be utilized to serve as the producer for the buffer, whereby the query thread shown in FIG. 8 in such an instance would perform only the consumer operations described below.

Routine 420 begins in block 422 by first determining whether the query thread is a current "producer" for the buffer. To ensure the integrity of the interim result set populated into the query buffer, it is typically desirable to serialize the population of buffer entries in the buffer. Otherwise, a risk may be presented that two threads could populate the same record into two different entries. As such, it is desirable to only allow one thread to be the producer at any given time. While it is possible in some environments to limit population functionality to only a subset of the query threads, in the illustrated embodiment, all threads are permitted to populate the buffer, but only whenever such threads are individually granted authority to operate as the producer. Any number of arbitration algorithms may be utilized to determine whether a given thread should be designated the producer at any given time, e.g., semaphores or atomic latches (e.g., for first come, first served), or other arbitration logic (e.g., round-robin logic). Other manners of arbitrating access to the buffer in a production capacity may be used in the alternative.

Assuming first that a query thread determines that it is functioning as the producer, block 422 passes control to block 424 to determine whether any more entries are needed in the buffer. For example, block 424 may determine whether any free entries exist in the buffer, or that the buffer is populated with below a certain threshold of filled entries.

If more entries are needed, block 424 passes control to block 426 to populate one or more entries in the buffer with records from the data source. It should be appreciated that the population of records into a buffer entry in block 426 operates as the execution of a portion of the query, even if the population protocol simply operates to populate the query buffer with every record from the data source (e.g., if it is desirable to simply parallelize the subsequent portion of the query by parsing out records to the multiple threads). More typically, some selection functionality is incorporated into the population operation so that only a subset of the records in the data source are populated into the query buffer. As an example, consider a query that incorporates an inner join of a index probe of one table with a scan probe of another table. The population of the records into the buffer may incorporate the probe of one of the tables so that some degree of work directed to executing the query is performed in connection with populating the buffer.

Block 426 may populate a single entry, or in the alternative, may populate multiple entries. For example, it may be desirable to fill every available entry in the buffer whenever it is determined that a particular thread is available to populate the buffer. Moreover, as discussed above, any number of records may be populated into each entry.

Upon completion of block 426, the producer phase of routine 420 is complete.

Block 428 initiates the consumer phase of routine 420. Block 428 is reached upon the completion of block 426, or in the alternative, whenever a thread determines it is not currently permitted to act as the producer in block 422, or that no entries are currently needed in block 424. Block 428 waits until an entry is available for processing by the thread.

It should be appreciated that if one thread is the producer at a given time, but that thread has not yet filled any buffer entry, other threads may be required to wait until entries are available for processing.

Once an entry is available, block 428 passes control to block 430 to obtain the next entry. Next, block 432 executes the desired portion of the query on the entry, and adds the results to a shared result buffer. Control then passes to block 434 to determine whether the query is complete. If so, routine 420 is complete. Otherwise, control returns to block 422 to return the query thread to the producer phase and determine whether additional population of the buffer is required.

It may be seen that in the database management system 400 of FIGS. 7 and 8, multiple threads share both producer and consumer tasks in association with implementing a parallel query. Moreover, it will be appreciated that a given thread may serve to produce entries for both itself, as well as other threads.

It has been found that if the work required to serial produce buffers in the manner described above exceeds the amount of work required to consume the buffers, a buffer bottleneck may occur. Assuming, however, that the consumer portion of the query is sufficiently complex, the parallel buffer entry consumption will typically not become data starved due to the serial production of entries in the buffer. It should also be appreciated that, given the above architecture, practically any arbitrary query can execute at least partially in parallel despite the fact that any portions of the query are non-uniform, and unable to be divided into discrete subranges.

Figure 9:
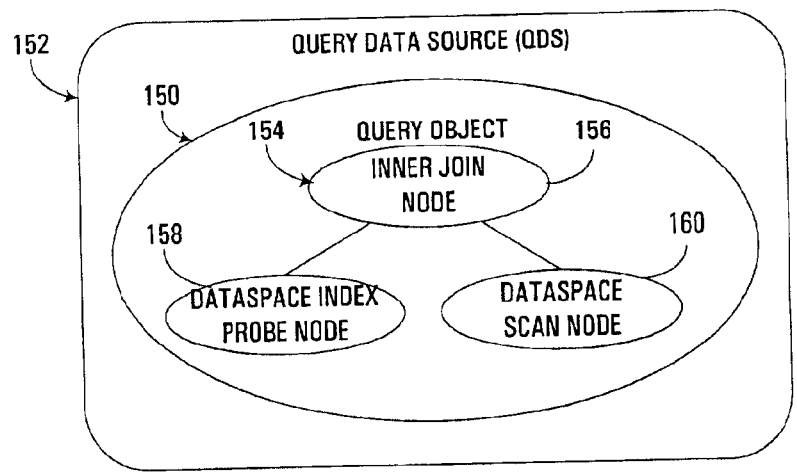
FIG. 9 is a block diagram of an exemplary query data source capable of being parallelized in a manner consistent with the invention.

FIGS. 9–17 next illustrate an exemplary implementation of the aforementioned dynamically-populated buffer used in connection with parallel query processing in the aforementioned object-oriented query model described above in connection with FIGS. 2–6C. In particular, FIG. 9 illustrates an exemplary query object 150 capable of being parallelized in the manner described above. In this example, it is assumed that query object 150 is specified to a query data source 152, representing the search space for the query implemented by query object 150. Moreover, in this example, a query tree 154 is illustrated including a parent inner join node 156 that performs an inner join operation on the results of a pair of nodes 158, 160 originally specified to the overall dataspace, here the query data source 152. Node 158 is shown as implementing an index probe, while node 160 is shown as implementing a table scan.

One of ordinary skill in the art having the benefit of the instant disclosure will appreciate that the user of a query buffer as described herein is particularly useful in connection with queries implementing inner joins, as the leftmost child node of an inner join node can be replaced with a node that accesses a query buffer that has been populated according the desired functionality of the left child node, with multiple threads utilized to consume the records populated into the buffer in parallel to accelerate the execution of the remainder of the inner join, particularly the operations performed by the right child node of inner join node.

Figure 10:
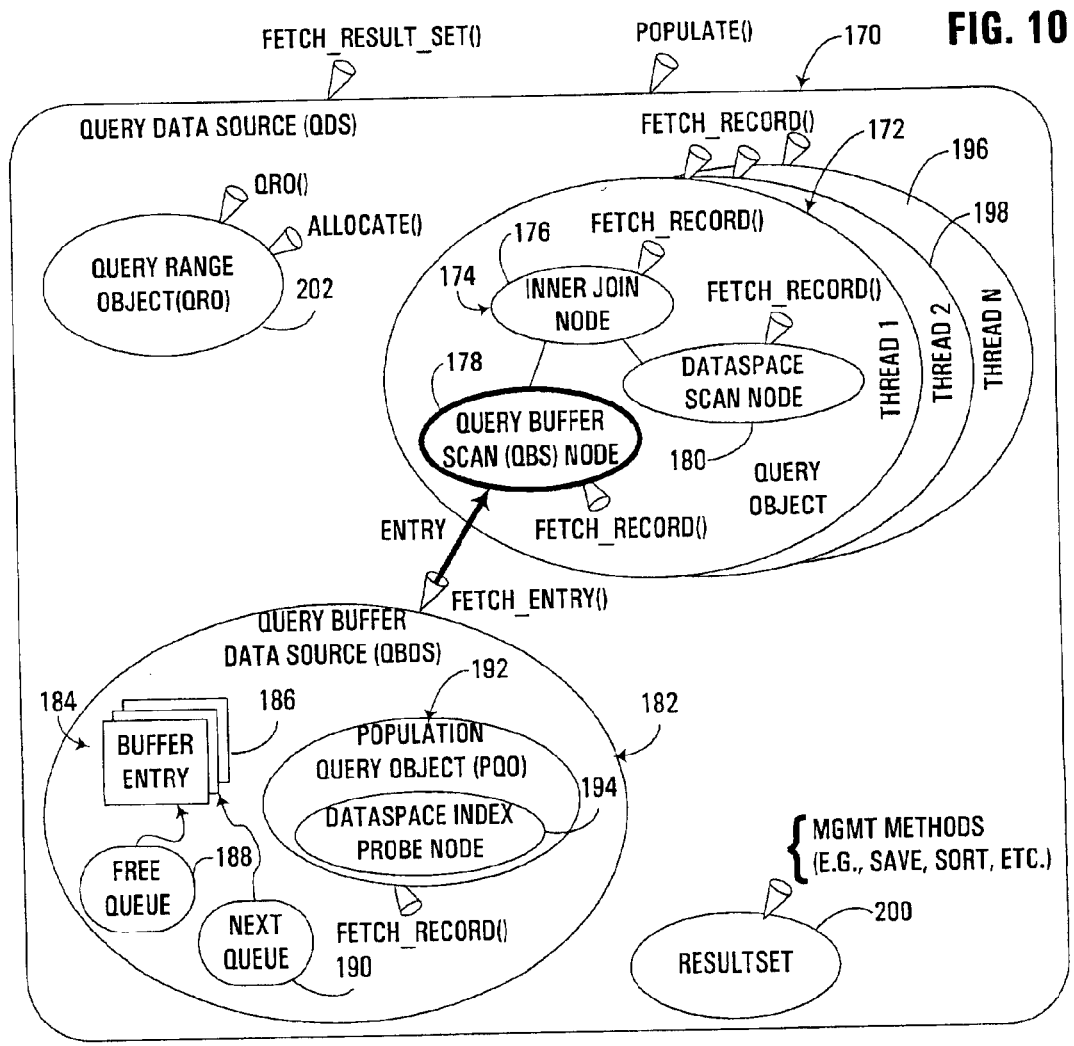
FIG. 10 is a block diagram of a query data source implementing a parallelized implementation of the query data source of FIG. 9.

In this regard, FIG. 10 illustrates how the query implemented by query object 150 may be parallelized in the manner described herein. In particular, FIG. 10 illustrates a query data source (QDS) 170 including a query object 172 with a query tree 174 implementing the same query as query tree 154 of FIG. 9. Query tree 174 includes an inner join node 176 and dataspace scan node 180 that correspond to inner join node 156 in dataspace scan node 160 of query tree 154. However, dataspace index probe node 158 of query tree 154 is replaced in query object 172 with a query buffer scan (QBS) node 178 that is utilized to consume or retrieve entries from a query buffer data source (QBDS) object 182.

Encapsulated within query buffer data source 182 is a query buffer 184 implemented using a plurality of reusable buffer entries 186 that are selectively appended to one of a pair of queues, free queue 188 and next queue 190. As will be described in greater detail below, buffer entries are added to next queue 190 as they are populated with records from the query data source, and are returned to the free queue once processed by a query thread. As described above, however, other manners of implementing a buffer may be used in the alternative.

Also encapsulated within query buffer data source 182 is a population query object (PQO) 192 that is utilized to populate entries in the buffer with appropriate records from the query data source. Population query object 192 may implement any number of algorithms to populate the buffer. Consistent with the exemplary query described above in connection with FIG. 9, population query object 192 is illustrated as including a dataspace index probe node 194 that performs essentially the same operations as dataspace index probe node 158 of query tree 154 (FIG. 9). Thus, population query object 192 is configured to perform a first portion of the query represented by node 158 of query tree 154 (FIG. 9), specified to query data source 170, while nodes 176–180 of query object 172 are configured to perform a second portion of the query represented by nodes 156 and 160 of query tree 154, but with node 178 specified to query buffer data source 182.

To parallelize the aforementioned query, query object 172 is instantiated multiple times, one for each thread. The instantiations of query object 172 for multiple threads are illustrated in FIG. 10 at 196 and 198, by way of example. It should be noted that each thread is specified to query buffer data source 182 by virtue of the specification of node 178 to the same. Given that other nodes, e.g., nodes 176 and 180 may be specified to other data sources, it should be appreciated that a thread may be specified to the query buffer data source even where certain nodes executed by that thread are specified to other data sources.

Also illustrated in FIG. 10 is a resultset object 200, which is an object utilized to store the results of the query. Also illustrated in the figure is a query range object (QRO) 202, which is utilized as an interface for each thread to determine when execution of a query is complete. Query range object may be implemented using an abstract object that is capable of atomically deciding whether to hand out a new entry from the query data source for processing by a thread. In other situations, object 202 may incorporate additional functionality, e.g., to hand out linear subranges of multiple records to multiple threads, e.g., where a particular node in a query tree is readily capable of being partitioned into linear subranges.

Also illustrated in FIG. 10 are the call signatures for a number of methods accessible on the various objects in query data source 170. Routines illustrating the operation of these various methods are illustrated in further detail in FIGS. 11–17.

Figure 11:
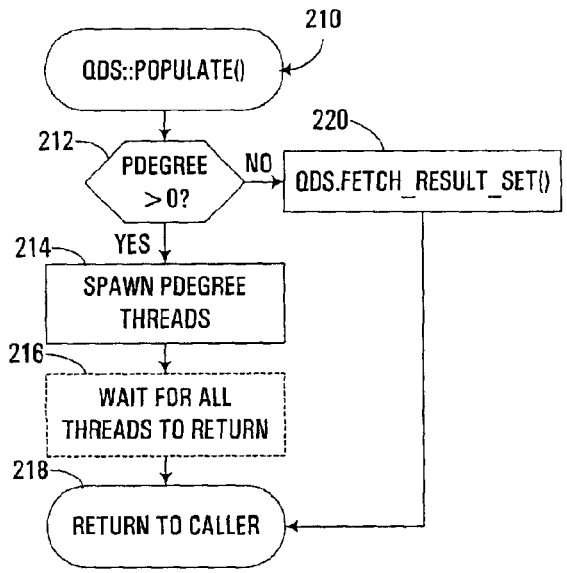
FIG. 11 is a flowchart illustrating the program flow of the populate( ) method for the query data source referenced in FIG. 10.

For example, FIG. 11 illustrates a populate( ) method 210 capable of being called upon query data source 170 to initiate execution of the query encapsulated thereby.

Method 210 begins in block 212 by determining whether a PDEGREE variable is greater than zero. In the illustrated implementation, the PDEGREE variable stores the number of threads to be utilized to execute a query in parallel, and it is envisioned that this variable may be provided in the method call, or in the alternative, may be a global variable accessible by the query data source. A desired parallel execution is indicated by a value of PDEGREE that is greater than zero, and results in block 212 passing control to block 214 to spawn the desired number of threads. Next, block 216 optionally waits for all threads to return, which occurs once all threads have completed execution of their respective duties when executing the parallelized portion of a query. Various wait mechanisms, such as maintaining a count of all active threads that is decremented when each thread returns, may be used. Moreover, in some implementations no waiting for threads may be required, whereby block 216 may be omitted.

Upon completion of block 216, block 218 returns to the calling entity. Method 210 is then complete. In addition, returning to block 212, if the value of PDEGREE is not greater than zero (indicating that a single threaded implementation should be used), block 212 passes control to block 220 to call a fetch_result_set( ) method on the query data source, the operation of which is described below in connection with FIG. 13. Block 220 then passes control to block 218, whereby method 210 is complete.

Figure 12:
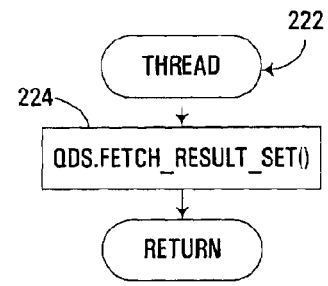
FIG. 12 is a flowchart illustrating the program flow of a thread spawned by the populate( ) method of FIG. 11.

FIG. 12 next illustrates the execution of one of the threads spawned in populate( ) method 210. In particular, FIG. 12 illustrates a routine 222 executed by each spawned thread, which essentially calls the fetch_result_set( ) method on the query data source on behalf of that thread (block 224). Upon completion of block 224, the operations of the thread are complete, whereby routine 222 returns to its calling entity.

Figure 13:
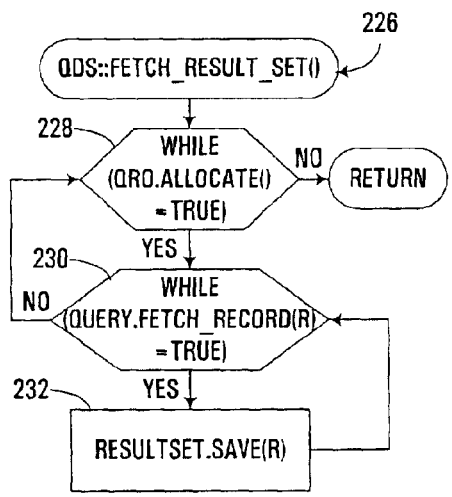
FIG. 13 is a flowchart illustrating the program flow of the fetch_result_set( ) method for the query data source referenced in FIG. 10.

FIG. 13 illustrates the program flow of the fetch_result_set( ) method 226 described above in connection with FIGS. 11 and 12. Method 226 is executed in each thread, and operates until no additional buffer entries are available for processing by the thread. Method 226 may be implemented using two nested WHILE loops initiated in blocks 228 and 230. Block 228 executes an allocate( ) method on the query range object, which returns either TRUE or FALSE based upon whether a range was allocated. Block 230, on the other hand, calls a fetch_record( ) method on the query object for the thread to obtain a record (R) that matches the query. For each located record, block 230 passes control to block 232 to save the record R to the result set, e.g., by calling a save method on the resultset object. Once all records have been retrieved, method 226 is complete.

It should be appreciated that the resultset object may include other management methods to perform operations such as saving, removing, modifying, etc., the records identified in the result set.

Figure 14:
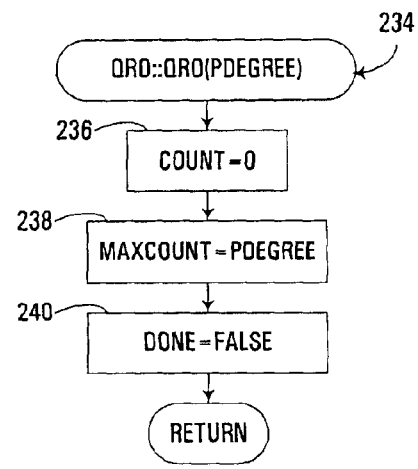
FIG. 14 is a flowchart illustrating the program flow of the constructor method for the query range object referenced in FIG. 10.

As discussed above in connection with block 228 of method 226, the query range object is queried for authorization by each thread using an allocate( ) method on the query range object. Prior to discussing the allocate( ) method, however, the constructor method 234 for the query range object is illustrated in FIG. 14. Method 234 is called during initial creation of the query range object, which occurs during creation of the query data source. Method 234 sets a COUNT variable to zero in block 236, and sets a MAXCOUNT variable to equal the PDEGREE variable discussed above (and supplied to constructor 234), representing the total number of threads to be executed, in block 238. Next, in block 240, a DONE variable is initialized to FALSE, whereby method 234 is complete.

Figure 15:
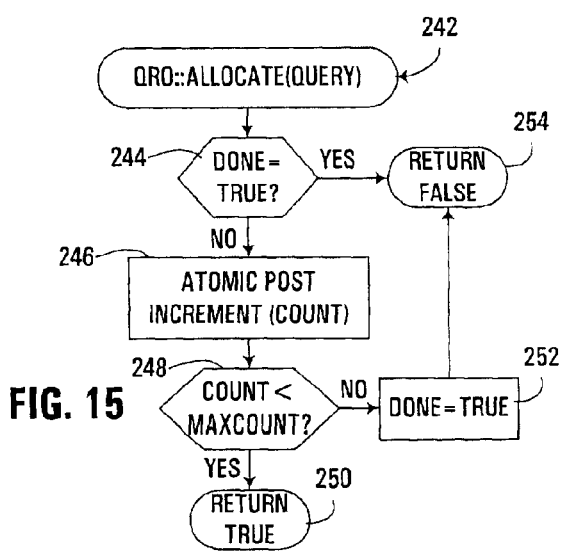
FIG. 15 is a flowchart illustrating the program flow of the allocate( ) method for the query range object referenced in FIG. 10.
Figure 16:
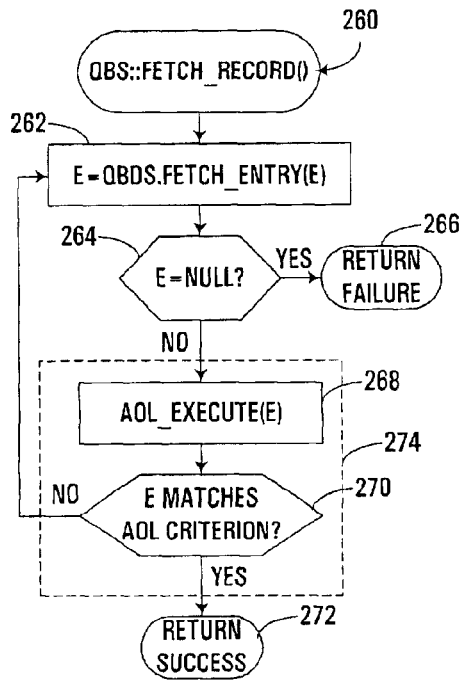
FIG. 16 is a flowchart illustrating the program flow of the fetch_record( ) method for the query buffer scan node referenced in FIG. 10.

FIG. 15 illustrates the allocate( ) method 242 for the query range object in greater detail. It is assumed in this example that the allocate( ) method will return a TRUE value only once for each thread. This is implemented by first checking at block 244 whether the DONE variable is equal to TRUE. If not, control passes to block 246 to perform an atomic post increment of the COUNT variable. As such, the previous value of the COUNT variable is compared to MAXCOUNT in block 248, and if count is less than MAXCOUNT, control passes to block 250 to return a "TRUE" value to the calling thread. Otherwise, control passes to block 252 to set the DONE variable to TRUE, and then to block 254 to return a "FALSE" result to the calling thread.

Returning to block 244, if the DONE variable is already to FALSE, control passes directly to block 254 to return a "FALSE" result to the calling thread.

As discussed above in connection with FIG. 13, each thread calls a fetch_record( ) method on its respective instantiation of the query object (QUERY). Returning briefly to FIG. 10, initiation of the fetch_record( ) method on the query object results of processing of the query by the query object, typically through controlling the execution of the various nodes in the query tree 174 in the manner described above in connection with FIGS. 2–6C. In this implementation, query object 172 is configured to control the order of execution of the nodes, and to invoke individual fetch_record( ) methods on each of the nodes as appropriate to implement the query. Thus, invocation of the fetch_record( ) method on query object 172 results in fetch_record( ) methods being called on each of nodes 176, 178 and 180. For nodes 176 and 180, implementation of the fetch_record( ) methods typically involves execution of the appropriate attribute operation lists (AOL's) associated with the nodes. For node 178, which is specified on the query buffer data source, and which is utilized to fetch appropriate records therefrom, the implementation of the fetch_record( ) method is as illustrated at 260 in FIG. 16.

Specifically, at block 262 a fetch_entry( ) method is called on the query buffer data source to retrieve another entry from the buffer for processing by the query object. A pointer E is returned by the fetch_entry( ) method pointing to the buffer entry returned by the query buffer data source. If the pointer E stores a NULL value (indicating that no further entries are available), block 264 passes control to block 266 to return a "FAILURE" to the calling method. Otherwise, control passes to block 268 to invoke the attribute operation list for the query buffer scan node on the current buffer entry, as shown at block 268. As a result of execution of the attribution operation list, it may be determined whether the current buffer entry matches the criterion specified by the attribute operation list in block 270. If the entry does not match, control passes to block 262 to fetch another entry. Otherwise, if a matching entry is found, control passes to block 272 to return a "SUCCESS" code, as well as return the reference or pointer to the matching entry.

In the illustrated implementation, each entry in the buffer corresponds to one record. As such, once a reference to an entry is obtained by method 260, that reference may be returned to the query data source object in the form of a reference to a record R. However, in other embodiments, a buffer entry may be capable of storing multiple records. As such, as shown at 274 in FIG. 16, blocks 268 and 270 may alternatively be configured to execute a loop that processes each record in a multi-record entry, executing the attribute operation list for each such record and identifying those records that match the attribution operation list criterion. In such an event, a partial result set may be generated with a reference thereto returned to the calling thread, or in the alternative, multiple references may be returned to the matching records in the entry. Other alternatives will be apparent to one of ordinary skill in the art having the benefit of the instant disclosure.

Figure 17:
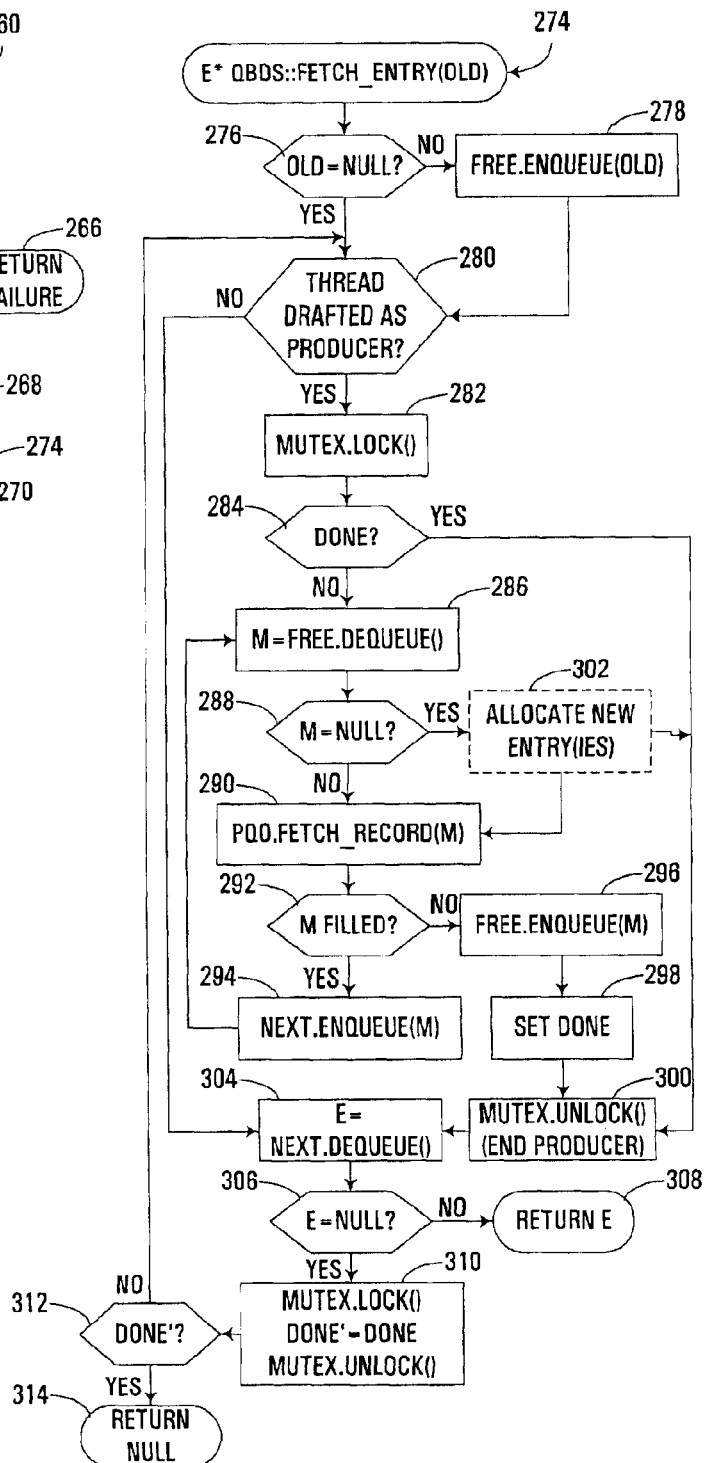
FIG. 17 is a flowchart illustrating the program flow of the fetch_entry( ) method for the query buffer data source referenced in FIG. 10.

FIG. 17 illustrates the fetch_entry( ) method 274 called on the query buffer data source by a query buffer scan node in a thread. Method 274 receives as input a reference to an old buffer entry (OLD). Moreover, the method returns a reference E to a new buffer entry requested by the calling query buffer scan node. As described above, a pair of queues, a free queue and a next queue, are utilized to store reusable buffer entries, which assist in memory management in a manner well known in the art. As such, method 274 begins in block 276 by determining whether the reference to the old entry is NULL, i.e., whether an old entry is being supplied to the method. If not NULL, block 276 passes control to block 278 to enqueue the old entry on the free queue. If no old entry was supplied, or upon completion of block 278, control passes to block 280 to determine whether the current thread has been drafted as a producer, much as described above in connection with FIGS. 7 and 8.

If the current thread has been drafted as a producer, control passes to block 282 where a lock is obtained on the query buffer data source. Next, block 284 determines whether the population process is complete, i.e., whether all buffer entries that need to be distributed have been distributed, typically by polling a DONE variable. If not, control passes to block 286 to dequeue an entry M from the free queue. Block 288 then determines whether a NULL reference was returned by the free queue, indicating that no entries are available on the free queue. If not, control passes to block 290 to call the fetch_record( ) method on the population query object to obtain another record to be passed to the query object. As described above, the population query object can include any suitable query functionality for retrieving a record from the data source. Given the exemplary query tree 154 of FIG. 9, for example, the population query object in the illustrated example may call the corresponding fetch_record( ) method on scan node 194 (FIG. 10) to retrieve another record matching the criterion set for the scan node.

Returning to FIG. 17, if the result of the fetch_record( ) method called on the population query object results in entry M being filled with a new record, block 292 passes control to block 294 to enqueue the entry on the next queue. Control then returns to block 286 to obtain another entry from the free queue, and attempt to fetch another record from the population query object. The loop of blocks 286–294 therefore executes until the fetch_record( ) method of the population query object does not return any new record. In this event, block 292 passes control to block 296 to enqueue the unused entry M back onto the free queue, and then to block 298 to set the DONE indicator. Block 300 then unlocks the lock on the query buffer data source, thereby effectively ending the producer phase of the fetch_entry( ) method.

Returning to block 288, if a NULL reference is returned in response to the dequeue( ) method called on the free queue in block 286, block 288 may pass control directly to block 300 to effectively end the producer phase for the query buffer data source fetch_entry( ) method. Otherwise, an optional block 302 may be called to allocate one or more new entries, and pass control to block 290 to proceed as described above. Moreover, returning to block 284, if the DONE indicator is set, control passes to block 300 to end the producer phase for the method.

Once the producer phase is complete for fetch_entry( ) method 274, control passes from block 300 to block 304. In addition, returning to block 280, if a thread has not been drafted as a producer, block 280 passes control directly to block 304.

Block 304 calls a dequeue( ) method on the next queue to obtain the next entry (E) from the queue. Block 306 then determines whether a NULL reference has been returned, and if not, control passes to block 308 to return a reference E to the entry to the calling entity. Otherwise, block 306 passes control to block 310 to perform an atomic copy (DONE') of the DONE indicator. Control then passes to block 312 to determine whether this copy (DONE') is set. If not, block 312 returns control to block 280. Otherwise, block 312 passes control to block 314 to return a NULL reference to the calling entity.

It should be appreciated that an entire query may be implemented in the aforementioned manner. In the alternative, a query or a query data source object may be implemented within a larger structure, e.g., as a node within a larger query execution tree. Also, query data sources may be chained together such that a query data source implementing parallel query execution may be called by another query data source. Given the extensibility and flexibility provided by the aforementioned object-oriented query model, an innumerable number of variations may be envisioned.

Various modifications may be made to the illustrated embodiments without departing from the spirit and scope of the invention. Therefore, the invention lies in the claims hereinafter appended.

What is claimed is:

1. A method of executing a database query, the method comprising:

(a) executing a first portion of a query to dynamically populate a query buffer with records from a data source; and (b) executing a second portion of the query in parallel using a plurality of threads specified to the query buffer; wherein the query buffer includes a plurality of entries, wherein executing the first portion of the query includes storing a record in an entry in the query buffer, and wherein executing the second portion of the database query includes, in each thread, retrieving an entry from the query buffer and executing the second portion of the query on a record on the retrieved entry.

2. The method of claim 1, wherein executing the first portion of the query dynamically populates the query buffer with records from the data source that match a first query criterion, and wherein executing the second portion of the query includes selecting those records among those populated in the query buffer that match a second query criterion.

3. The method of claim 1, wherein executing the first portion of the query is performed serially.

4. The method of claim 1, wherein executing the first portion of the query is performed by a thread that is separate from the plurality of threads that execute the second portion of the query.

5. The method of claim 1, wherein executing the first portion of the query is performed by a thread among the plurality of threads.

6. The method of claim 5, wherein executing the first portion of the query is performed by different threads among the plurality of threads at different times.

7. The method of claim 6, wherein executing the first portion of the query includes determining whether a thread among the plurality of threads has been drafted as a producer, and if so, serially executing the first portion of the query in the producer thread.

8. The method of claim 1, wherein executing the second portion of the query consumes records from the query buffer in parallel with dynamically populating the query buffer.

9. The method of claim 1, wherein each entry is configured to store a plurality of records.

10. The method of claim 1, wherein executing the first portion of the query includes populating at least one entry with a uniform set of records.

11. The method of claim 1, wherein executing the first portion of the query includes populating at least one entry with a non-uniform set of records.

12. The method of claim 1, wherein executing the first and second portions of the query each include executing an attribute operation list associated with a node defined in a query object, the attribute operation list configured to manipulate at least one attribute described in an attribute descriptor array.

13. An apparatus, comprising:
   (a) a memory within which is resident at least a portion of a database; and
   (b) program code configured to execute a query on the database, the program code configured to execute a first portion of the query to dynamically populate a query buffer with records from the database, and to execute a second portion of the query in parallel using a plurality of threads specified to the query buffers;
wherein the query buffer includes a plurality of entries, wherein the program code is configured to execute the first portion of the query by storing a record in an entry in the query buffer, and wherein the program code is configured to execute the second portion of the database query by, in each thread, retrieving an entry from the query buffer and executing the second portion of the query on a record on the retrieved entry.

14. The apparatus of claim 13, wherein the program code is configured to execute the first portion of the query to dynamically populate the query buffer with records from the database that match a first query criterion, and wherein the program code is configured to execute the second portion of the query by selecting those records among those populated in the query buffer that match a second query criterion.

15. The apparatus of claim 13, wherein the program code is configured to serially execute the first portion of the query.

16. The apparatus of claim 13, wherein the program code is configured to execute the first portion of the query in a thread that is separate from the plurality of threads that execute the second portion of the query.

17. The apparatus of claim 13, wherein the program code is configured to execute the first portion of the query in a thread among the plurality of threads.

18. The apparatus of claim 17, wherein the program code is configured to execute the first portion of the query in different threads among the plurality of threads at different times.

19. The apparatus of claim 18, wherein the program code is configured to execute the first portion of the query by determining whether a thread among the plurality of threads has been drafted as a producer, and if so, serially executing the first portion of the query in the producer thread.

20. The apparatus of claim 13, wherein the program code is configured to execute the second portion of the query to consume records from the query buffer in parallel with dynamically populating the query buffer.

21. The apparatus of claim 13, wherein each entry is configured to store a plurality of records.

22. The apparatus of claim 13, wherein the program code is configured to execute the first portion of the query by populating at least one entry with a uniform set of records.

23. The apparatus of claim 13, wherein the program code is configured to execute the first portion of the query by populating at least one entry with a non-uniform set of records.

24. The apparatus of claim 13, wherein the program code is configured to execute the first and second portions of the query each by executing an attribute operation list associated with a node defined in a query object, the attribute operation list configured to manipulate at least one attribute described in an attribute descriptor array.

25. A program product, comprising:
   (a) program code configured to execute a database query, the program code configured to execute a first portion of the query to dynamically populate a query buffer with records from a data source, and to execute a second portion of the query in parallel using a plurality of threads specified to the query buffer; and
   (b) a signal bearing medium bearing the program code;
wherein the query buffer includes a plurality of entries, wherein the program code is configured to execute the first portion of the query by storing a record in an entry in the query buffer, and wherein the program code is configured to execute the second portion of the database query by, in each thread, retrieving an entry from the query buffer and executing the second portion of the query on a record on the retrieved entry.

26. The program product of claim 25, wherein the signal bearing medium includes at least one of a transmission medium and a recordable medium.

* * * * *